Patented Apr. 4, 1950

2,502,619

UNITED STATES PATENT OFFICE 2,502,619

PURIFYING SALTS OF SULFONIC ACIDS

Wayne A. Proell, Chicago, Ill., and Bernard L. Hill, Whiting, Ind., assignors to Standard Oil Company, Chicago, Ill., a corporation of Indiana No Drawing. Application October 23, 1947, Serial No. 781,750

9 Claims. (Cl. 260—429)

This invention relates to a process for purifying salts of sulfonic acids which contain colloidal and coloring matter, especially colloidal and coloring matter which cannot be completely removed by contacting a solution of said salt with a solid adsorbent material, for example, active carbon or charcoal. The process of our invention is particularly applicable to the removal of colloidal materials and extraneous coloring matter from salts of alkanesulfonic acids, especially non-detergent alkanesulfonates containing 1 to 5 carbon atoms, inclusive, in the alkyl group of the alkanesulfonate radical.

New and commercially applicable synthesis of alkanesulfonic acids have been described and claimed in applications for Letters Patent filed by W. A. Proell, alone and with others.

Alkyl and cycloalkyl mercaptans or other hydrocarbon thiols can be oxidized to the corresponding sulfonic acids by a gas stream containing free oxygen, for example, air, and a small catalytic quantity of a nitrogen oxide selected from the group consisting of NO, $NO_2$, $N_2O_3$, $N_2O_4$ and $N_2O_5$ at temperatures below about 300° F., preferably between about 50° F. and about 120° F., and at pressures between about 5 and about 50 p. s. i. g., as described and claimed in application for Letters Patent Serial No. 718,900 filed by Wayne A. Proell and Bernard H. Shoemaker on December 27, 1946.

Sulfur compounds having the formula $R_1S_nR_2$ wherein $R_1$ and $R_2$ are hydrocarbon radicals, S is sulfur and $n$ is an integer having a value between 1 and 6, preferably having a value of 2, can be oxidized to sulfonic acids containing more or less intermediate oxidation products, such as disulfoxides, disulfones and sulfonic anhydrides, by a gas stream containing free oxygen and a catalytic quantity of a nitrogen oxide selected from the group consisting of NO, $NO_2$, $N_2O_3$, $N_2O_4$ and $N_2O_5$ at temperatures between about 20° F. and about 250° F., and pressures between about 5 and about 50 p. s. i. g., as described and claimed in U. S. Patent 2,433,395, issued to Wayne A. Proell and Bernard H. Shoemaker on December 30, 1947. The oxidation can be conducted in two stages to obtain maximum efficiency, the first stage being operated at temperatures between about 20° C. and about 50° C. to produce a reaction mixture containing between about 40 and about 70 per cent of sulfonic acid, and the second stage operated at temperatures between about 70° C. and about 150° C. to yield a product containing at least 90 weight per cent of sulfonic acid, as described and claimed in U. S. Patent 2,433,396, issued to Wayne A. Proell on December 30, 1947.

The oxidation of hydrocarbon disulfides, mercaptans or sulfoxides can also be effected under substantially anhydrous conditions to yield a mixture of sulfonic acids and anhydrides thereof, as described and claimed in U. S. Patent 2,489,316, issued to Wayne A. Proell on November 29, 1949.

The above-mentioned oxidation processes for the production of sulfonic acids entail accurate and delicate control of the temperature in the oxidation reactor. Despite the most careful attention to the control of the reaction temperature, localized overheating at times occurs in the oxidation reaction zone and leads to the production of sulfonic acids containing colloidal and colored matters. These are undesirable and can greatly reduce the utility of the alkanesulfonic acid products and of their derivatives such as metal salts for numerous purposes.

We have found that the colloidal and coloring matter in salts of alkanesulfonic acids produced by the above-mentioned processes cannot be completely removed by conventional methods, e. g., merely by contacting a solution of alkanesulfonic salt with a solid adsorbent such as charcoal. We do not know precisely the identity of the colloidal and coloring matter contained in the alkanesulfonic acid produced by the above-mentioned processes; however, we have reason to believe that they comprise resinous polymeric sulfonic acids with enough sulfonic acid groups to peptize them in aqueous solutions.

It is an object of our invention to provide a process for purifying salts of sulfonic acids which contain colloidal and coloring matter which cannot be entirely removed merely by contacting solutions of said salts with solid adsorbents such as charcoal. Another object of our invention is to provide a process for removing extraneous colloidal and colored impurities from salts of alkanesulfonic acids containing the same. An additional object is to provide decolorized metal salts of alkanesulfonic acids. Yet another object is to provide metal salts of alkanesulfonic acids from whose solutions improved electrodeposits can be produced upon electrolysis. Still other objects will become apparent from the ensuing description of our invention.

We have discovered that colloidal and coloring matter contained in salts of sulfonic acids and not readily removable by adsorption can be converted to products which can be adsorbed upon a conventional adsorbent such as charcoal by a process which involves the thermal treatment of said salts in the solid condition. The precise conditions of the thermal treatment are dependent to some extent on the particular salt being treated, the amount and nature of the colloidal and coloring matter therein contained and the extent of purification sought to be effected. The thermal treatment of this invention renders possible substantially complete removal of colloidal and coloring matter from salts of sulfonic acids. The temperature and time of treatment in accordance with our invention are regulated to avoid substantial decomposition of the salt being treated. Our experience with the thermal treatment of solid metal salts of alkanesulfonic acids containing 1 to 5 carbon atoms, inclusive, in the alkanesulfonate radical indicates that temperatures between about 100° C. and about 250° C. (but below the thermal decomposition temperature of the salt being treated) and treating periods varying from about 1 to about 48 hours are usually suitable. Generally, we prefer to employ temperatures between about 150° C. and about 175° C. and thermal treating periods between about 4 and about 12 hours. It will be appreciated, however, that some departure from the above temperature and time ranges may be advisable in certain instances and that higher or lower temperatures and shorter or longer treating periods can be employed without departing from the spirit of this invention. If desired, the thermal treatment may be effected under partial vacuum in order to increase the ease of removal of relatively volatile products which may be produced in the thermal treating zone.

The thermal treatment can be effected batchwise or continuously by the employment of equipment conventional in the art for the drying and heat treatment of solids. Thus, heating kilns operating at controlled temperature and pressure may be employed through which the solid salts can be conveyed by screw, bucket, belt or other conveyors at a controlled rate. The solid alkanesulfonic salts may also be suspended in a current of inert gas and treated while in the "fluidized" condition; this method of contacting powdered solid materials (usually catalysts) with gases is well known and extensively practiced in the petroleum industry, e. g., in effecting such operations as the catalytic cracking of hydrocarbon vapors. For the purpose of treating alkanesulfonic salts by the "fluid" process, they may be ground or otherwise reduced to suitable size, e. g., between about 10 and about 400 mesh, e. g. 50–100 mesh. Suitable suspending and heating gases for the treatment of powdered or granular alkanesulfonates comprise flue gases, air, nitrogen, carbon dioxide, and the like. If desired, the granular or powdered alkanesulfonic salts may be fluidized in admixture with an inert granular material or with an adsorbent granular material such as an active carbon or the like. Following the thermal treatment the alkanesulfonate may be dissolved in a solvent in the presence of the adsorbent granular material and then filtered, leaving a filtrate substantially free of colloidal and coloring matter. The adsorbent may be regenerated and recycled to the thermal treating zone. If such treatment is used, shorter reaction times may be indicated, e. g., temperatures of about 150–230° C. and times of 15 minutes to 1 hour.

The precise nature of the changes which occur in the colloidal and coloring matter is not known to us at present. It is difficult in the extreme to determine the nature of the reactions effected by the thermal treatment because of the chemical complexity and large number of colloidal and coloring materials present in the salts being treated. However, it may be supposed that the thermal treatment results in pyrolysis and rearrangement in the structures of the coloring and colloidal materials. The relatively low temperatures at which these changes can be effected conduces to the suspicion that some catalyst for the chemical reactions is present, and further, that the metal sulfonate itself is the catalyst which influences the chemical reactions in question. We do not choose to be bound by our theories regarding the nature of the changes which occur during the thermal treatment of this invention. We have made the practically important observation that the thermal treatment of the salts of sulfonic acids converts colloidal and coloring matters into products which can readily be adsorbed by a solid adsorbent such as charcoal.

To effect the adsorption of impurities, the thermally treated solid sulfonate is dissolved in a solvent, usually water or aqueous organic solvents, and the solution is contacted with a solid adsorbent material by percolation or other methods known in the art, following which the solution is separated from the adsorbent material. The purified solution may be concentrated or diluted, or solvent may be distilled from the solution to leave a solid residue of substantially pure salt of a sulfonic acid devoid of extraneous colloidal and coloring matters, as necessary in the use for which the product is intended. Our invention is particularly applicable to salts derived from alkanesulfonic acids containing 1 to 5 carbon atoms, inclusive, in the alkanesulfonate radical and to salts derived from mixtures of such alkanesulfonic acids. Thus, our invention may be applied to such alkanesulfonic salts as sodium, potassium, lithium, copper, silver, ammonium, calcium, barium, strontium, zinc, cadmium, magnesium, mercury, aluminum, manganese, iron, cobalt, nickel or even to the sulfonates of rare earth metals.

The following examples are intended to illustrate the process of our invention but not necessarily to limit the same.

*Example 1*

Lead ethanesulfonate was prepared by reacting an excess of lead carbonate with a diluted (50 per cent) crude ethanesulfonic acid. The ethanesulfonic acid was prepared by oxidizing ethyl disulfide with air and small, catalytic quantities of nitrogen oxides produced by decomposition of a small amount of strong nitric acid in the oxidation zone. The crude ethanesulfonic acid thus produced analyzed 87.5 per cent by weight ethanesulfonic acid, 1.7 per cent by weight sulfuric acid and 9.4 per cent by weight of ash and insolubles. The lead ethanesulfonate solution was deep brown. The colored solution was stirred with 1 per cent by weight of charcoal and filtered, several charcoal treats being used in all. As a result of these charcoal treats the solution was clarified to a pale orange color; an additional treatment with 1 per cent of charcoal resulted in no further color improvement. The solution was then evaporated to dryness at about 135° C. and maintained at this temperature 16 hours at atmospheric pressure in an air oven. Although the solid salt obtained as a result of the thermal treatment was brown, it was found that upon redissolution in water and treatment of the resulting solution with charcoal in two 1% additions, the solution became water white and the evaporation of water therefrom yielded white solid lead ethanesulfonate.

Example 2

Crude black mixed alkanesulfonic acids containing 1 to 4 carbon atoms in the molecule were neutralized with excess zinc carbonate. The mixed sulfonic acids were prepared by oxidizing a mixture of alkyl disulfides containing 1 to 4 carbon atoms in the alkyl group derived from the oxidation of a mixture of mercaptans extracted from a petroleum naphtha. In addition to the sulfonic acid content, there were present 3.1 per cent by weight of sulfuric acid, 6.7 per cent by weight of water and 0.02 per cent by weight of ash. The acid could be neutralized by 477 mg. KOH per gram of liquid acid. It was found impossible to decolorize the aqueous solution of zinc alkanesulfonates to a lighter color than deep brown by repeated treatments with the charcoal. The solution was evaporated to yield the dry zinc alkanesulfonates which were dried 16 hours at about 135° C. The thermally treated solid zinc salts constituted a black amorphous tarry material containing no crystals. The tarry salt was then dissolved in water, stirred vigorously with charcoal which was added in three 1 per cent batches and filtered from the charcoal. The filtrate was a water white solution which upon evaporation of the water yielded a mass of white zinc alkanesulfonate crystals some of which were colored a slight yellow locally.

Although salts of lower molecular weight akanesulfonic acids are readily soluble in water and water is consequently a good solvent in which to carry out the operation of adsorbing colloidal and coloring matters from the thermally treated salts, it should be understood that other solvents may also be employed, alone or in addition to water. Thus, various organic solvents may be employed on occasion. In general, suitable solvents comprise alcohol and acetone although their use is limited to only some of the soluble sulfonates.

Although charcoal was employed in the process of the examples, it should be understood that other solid adsorbents may be used in lieu thereof. Thus, we may employ activated carbons of all sorts, silica gel and other siliceous adsorbents.

Although the above examples describe adsorption of colloidal materials and coloring matter at about room temperature, it will be appreciated that the adsorption operation can be conducted over a relatively wide temperature range, for example, temperatures between about 30° C. and about 100° C., in aqueous solutions, as circumstances warrant. Between about 0.1 and about 5 weight per cent of adsorbent, based on the weight of salt may be employed and may, as the examples show, be added incrementally to the solution of alkanesulfonate.

Although we have described our process with specific reference to metal salts of certain alkanesulfonic acids, it may be applied generally to salts of sulfonic acids, for example, salts of aliphatic or aromatic sulfonic acids, containing colloidal and coloring matters which can not be removed by simple adsorption from their solutions.

Having thus described our invention, what we claim is:

1. In a process for removing extraneous colloidal and coloring matter from a metal salt of an alkanesulfonic acid, said alkanesulfonic acid being produced by the oxidation of an alkyl disulfide in the presence of a nitrogen oxide selected from the group consisting of $NO$, $NO_2$, $N_2O_3$, $N_2O_4$, and $N_2O_5$, the step of subjecting said salt in the solid state to an elevated temperature between about 100° C. and about 200° C. for a time period between about 1 and about 48 hours, thereafter dissolving said salt in a solvent and contacting the resultant solution with a solid adsorbent in an amout sufficient substantially to remove colloidal and coloring matter from said solution.

2. The process of claim 1 wherein the salt is a lead salt.

3. The process of claim 1 wherein the salt is a zinc salt.

4. The process of claim 1 wherein the salt is a copper salt.

5. In a process for removing extraneous colloidal and coloring matter from a metal salt of an alkanesulfonic acid containing 1 to 5 carbon atoms, inclusive, in the alkanesulfonic radical, said alkanesulfonic acid being produced by the oxidation of an alkyl disulfide in the presence of a nitrogen oxide selected from the group consisting of $NO$, $NO_2$, $N_2O_3$, $N_2O_4$, and $N_2O_5$, the step of subjecting said salt in the solid state to an elevated temperature between about 100° C. and about 200° C. for a time period between about 1 and about 48 hours, thereafter dissolving said salt in a solvent consisting essentially of water and contacting the resultant solution with adsorbent carbon in an amount sufficient substantially to remove colloidal and coloring matter from said solution.

6. A process for removing extraneous colloidal and coloring matter from a metal salt of an alkanesulfonic acid containing 1 to 5 carbon atoms, inclusive, in the alkanesulfonate radical, said alkanesulfonic acid being produced by the oxidation of an alkyl disulfide in the presence of a nitrogen oxide selected from the group consisting of $NO$, $NO_2$, $N_2O_3$, $N_2O_4$, and $N_2O_5$, which process comprises contacting a solution of said salt with an active solid adsorbent in quantity sufficient to effect at least partial removal of colloidal and coloring matter from said solution by adsorption, thereafter removing solvent from said solution and separating said salt in the solid state, subjecting said salt in the solid state to an elevated temperature between about 100° C. and about 200° C. for a time period between about 1 and about 48 hours, thereafter dissolving said salt in a solvent and contacting the resultant solution with a solid adsorbent in an amount sufficient substantially to remove colloidal and coloring matter from said solution.

7. In a process for removing extraneous colloidal and coloring matter from a metal salt of an alkanesulfonic acid containing 1 to 5 carbon atoms, inclusive, in the alkanesulfonic radical, said alkanesulfonic acid being produced by a process which comprises contacting an alkyl disulfide with a gas containing free oxygen and a catalytic quantity of a nitrogen oxide selected from the group consisting of $NO$, $NO_2$, $N_2O_3$, $N_2O_4$ and $N_2O_5$, the step of subjecting said salt in the solid state to an elevated temperature between about 100° C. and about 200° C. for a period between about 1 and about 48 hours, thereafter dissolving said salt in an aqueous solvent and contacting the resultant solution with a solid adsorbent in an amount sufficient substantially to remove colloidal and coloring matter from said solution.

8. In a process for removing extraneous colloidal and coloring matter from a salt of an alkanesulfonic acid containing 1 to 5 carbon atoms, inclusive, in the alkanesulfonic radical, said alkanesulfonic acid being produced by a process which comprises contacting an alkyl disulfide with a gas containing free oxygen and a catalytic quantity of a nitrogen oxide selected from the group consisting of NO, $NO_2$, $N_2O_3$, $N_2O_4$ and $N_2O_5$, the step of subjecting said salt in the solid state to an elevated temperature between about 100° C. and about 200° C. for a period between about 1 and about 48 hours, thereafter dissolving said salt in an aqueous solvent and contacting the resultant solution with a solid adsorbent in an amount sufficient substantially to remove colloidal and coloring matter from said solution.

9. In a process for removing extraneous colloidal and coloring matter from a salt of an organic sulfonic acid produced by the oxidation of a sulfur compound selected from the group consisting of hydrocarbon thiols and sulfur compounds having the formula $R_1S_nR_2$ wherein $R_1$ and $R_2$ are hydrocarbon radicals, S is sulfur and $n$ is an integer having a value between 1 and 6, said oxidation being effected in the presence of a nitrogen oxide selected from the group consisting of NO, $NO_2$, $N_2O_3$, $N_2O_4$ and $N_2O_5$, the step of subjecting said salt to an elevated temperature between about 100° C. and about 200° C. for a period between about 1 and about 48 hours, sufficient to effect substantial conversion of said colloidal and coloring matter to adsorbable products, thereafter dissolving said salt in a solvent and contacting the resultant solution with a solid adsorbent in an amount sufficient substantially to remove colloidal and coloring matter from said solution.

WAYNE A. PROELL.
BERNARD L. HILL.

REFERENCES CITED

The following references are of record in the file of this patent:

UNITED STATES PATENTS

| Number | Name | Date |
|---|---|---|
| 2,142,162 | Werntz | Jan. 3, 1939 |
| 2,316,670 | Colgate et al. | Apr. 13, 1943 |